United States Patent
Bass

(10) Patent No.: US 8,157,020 B1
(45) Date of Patent: Apr. 17, 2012

(54) FLAME SUPPRESSION SYSTEM FOR BARBECUE GRILLS AND ASSOCIATED USE THERFOR

(76) Inventor: Dustin L. Bass, Lake City, FL (US)

( * ) Notice: Subject to any disclaimer, the term of this patent is extended or adjusted under 35 U.S.C. 154(b) by 354 days.

(21) Appl. No.: 12/454,392

(22) Filed: May 18, 2009

(51) Int. Cl.
*A62C 3/00* (2006.01)

(52) U.S. Cl. ............ 169/65; 169/13; 239/548; 126/25 C

(58) Field of Classification Search ............. 169/65, 169/70; 239/423, 424, 548, 559, 567; 126/25 C
See application file for complete search history.

(56) References Cited

U.S. PATENT DOCUMENTS

| | | | | |
|---|---|---|---|---|
| 890,155 | A | * 6/1908 | Mastin | ............ 222/400.8 |
| 3,362,586 | A | 1/1968 | Dedoes | |
| 3,756,140 | A | 9/1973 | Kolivas | |
| 3,782,475 | A | 1/1974 | Schmidt | |
| 4,560,007 | A | * 12/1985 | Molloy et al. | ............ 169/54 |
| 5,092,312 | A | * 3/1992 | Zolow | ............ 126/500 |
| 5,351,760 | A | 10/1994 | Tabor. Jr. | |
| 5,353,880 | A | * 10/1994 | Green | ............ 169/65 |
| 5,511,535 | A | 4/1996 | Landstrom et al. | |
| D372,560 | S | 8/1996 | Matigian | |
| 6,386,093 | B1 | 5/2002 | Mackay | |
| 6,431,164 | B1 | * 8/2002 | Wardell | ............ 126/5 |
| 6,582,745 | B1 | * 6/2003 | Northern | ............ 426/523 |
| 6,631,712 | B2 | 10/2003 | Koncelik, Jr. | |

* cited by examiner

*Primary Examiner* — Dinh Nguyen
(74) *Attorney, Agent, or Firm* — Montgomery Patent & Design, LLC; Robert C. Montgomery; Joseph T. Yaksich

(57) ABSTRACT

A flame suppression device adaptable to conventional barbeque grills for emergency use while grilling food comprises a water reservoir holding approximately two (2) gallons of water is located at the base of the grill is herein disclosed. A manual operated pump provides pressurized water from the reservoir into a tube which is routed to a valve and then to a plurality of nozzles located directly above the cooking surface and above the heating element. To operate while grilling, a person would open the valve to release water to extinguish any unwanted flames.

16 Claims, 4 Drawing Sheets

FLAME SUPPRESSION SYSTEM FOR BARBECUE GRILLS AND ASSOCIATED USE THERFOR

RELATED APPLICATIONS

The present invention was first described in a notarized Official Record of Invention on Jul. 24, 2008, that is on file at the offices of Montgomery Patent and Design, LLC, the entire disclosures of which are incorporated herein by reference.

FIELD OF THE INVENTION

The present invention relates generally to a barbeque grill accessory and, more particularly, to said barbeque grill accessory which provides a flame suppression means to a heating element without damaging the foodstuffs.

BACKGROUND OF THE INVENTION

Spending time in the great outdoors is among the most popular fair weather leisure time activities. Quite often, cooking and eating a meal is made part of the outdoor activity. Whether it is a family gathering, at a picnic or just having a cookout, a great deal of time is spent around a barbeque grill. While no one will deny that barbequing food adds a flavor that cannot be beat, it does have some disadvantages. Probably the most prominent disadvantage of barbequing is that inadvertent flame ups from grease and oil can often burn and destroy the grilled food. Many users resort to an external spray container, flame extinguishers, or even a glass of water to extinguish such flame ups as they occur. However, these attempts often leaves water which commonly ends up upon the food being cooked thus contaminating it and perhaps ruining the taste as well or overly dampens the flame or heating element which can also lead to uneven or improperly cooked foodstuff.

Various attempts have been made in the past to overcome these disadvantages and provide a means of suppressing flame ups while barbeque grilling food, although the present invention substantially departs from the conventional solutions and in doing so provides a means by which flames can be suppressed or extinguished without damaging the quality of the foodstuff being grilled without the aforementioned problems. Among the relevant attempts to address these problems are several U.S. patents, including U.S. Pat. Nos. 3,756,140; 3,782,475; 5,351,760; 5,511,535; 6,386,093; and 6,631,712.

U.S. Pat. No. 3,362,586, issued in the name of Dedoes, describes a barbeque fan and fire quenching accessory comprising a hand held pressurized container with a nozzle and a battery powered fan which provides a stream of liquid and forced air to quench a flame during grilling.

U.S. Pat. No. 5,353,880, issued in the name of Green, describes a flame extinguisher system of a barbeque comprising a fluid discharge conduit having a plurality of apertures which force and delivers streams of water onto the heating element.

Additionally, ornamental designs for fire extinguishers for grills exist, particularly, U.S. Pat. No. D 372,560. However, none of these designs are similar to the present invention.

While these devices fulfill their respective, particular objectives, each of these references suffers from one (1) or more of the aforementioned disadvantages. Accordingly, there exists a need for a means by which the flame ups resulting from the grilling of foodstuffs can be easily extinguished without the disadvantages as described above. The development of the present invention fulfills this need.

SUMMARY OF THE INVENTION

In view of the foregoing references, the inventor recognized the aforementioned inherent problems and observed that there is a need for a means to suppress or extinguish excessive flames during barbeque grilling while not damaging the quality or taste of the foodstuffs being grilled and thus, the object of the present invention is to solve the aforementioned disadvantages.

To achieve the above objectives, it is an object of the present invention to provide a flame suppression device adaptable to a conventional barbeque grill for use while grilling food generally comprising a water holding reservoir and a pump which provides a pressurized spray of water from the reservoir to the inside of the grilling area directly below the cooking surface and above the heating element. The invention provides a means to utilize the invention while grilling and enables a person to open the valve to release water to suppress or extinguish any unwanted flame ups of flames due to drippage from cooking foodstuffs.

Another object of the apparatus is to provide an apparatus comprising a water storage means, a water pressurizing means, a water distribution means, an actuating means, and a water delivery means which provides a flame suppression means to the inside of a barbeque grill cooking chamber.

Yet still another object of the apparatus is to provide the water storage means comprising a storage tank which is mounted to a lower end of the barbeque grill and may be introduced in various sizes suitable to accommodate various sized barbeque grills.

Yet still another object of the apparatus is to provide the water pressuring means comprising a manually operated pump that is located on a top end of the storage tank and provides a means of pressurizing the area inside of the storage tank.

Yet still another object of the apparatus is to provide the actuating means comprising a manually engaged control valve located in an area which is easily accessible while using the barbeque grill.

Yet still another object of the apparatus is to provide the water delivery means comprising a plurality of "T"-fittings and a plurality of spray nozzles which distributes the flame suppression means to the inside of the grilling chamber during barbeque cooking.

The "T"-fittings are mounted on an external lower end of grilling chamber such that one end projects into the interior of the grilling chamber. The spray nozzle is connected to the "T"-fitting on the end which projects into the interior of the grilling chamber which provides the flame suppression means to the heating element as needed.

Yet still another object of the apparatus is to provide the flame suppression means comprising a water spray pattern having a flat and fan-like configuration which is directed to toward the heating element and provides a means of extinguishing flame ups due to grease or other food stuffs dripping onto the heating element.

Yet still another object of the apparatus is to provide the water distribution means comprising a plurality of heat resistant tube sections which route the pressurized water to the interior of the grilling chamber. A section of tubing connects the output of the storage tank to the control valve. A section of tubing connects the control valve to the first "T"-fitting. A section of tubing connects each additional "T"-fitting to one (1) another.

Yet still another object of the apparatus is to provide the plurality of "T"-fittings in series and of various numbers depending on the overall size of the grilling surface and the grilling chamber.

Yet still another object of the apparatus is to provide the invention as a build in feature integral to new barbeque grills.

Yet still another object of the apparatus is to provide the invention as a retrofit device to existing gas grills.

Yet still another object of the apparatus is to provide a method of utilizing the use of the invention which provides a flame suppression or extinguishing means for barbeque grilling without the worry of a flame ups, burnt food, or other disasters in a manner that is quick, easy and effective.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | flame suppression apparatus for barbeque grills |
| 15 | barbeque grill |
| 20 | storage tank |
| 25 | manual pump |
| 30 | flexible heat resistant tubing |
| 35 | control valve |
| 40 | spray nozzles |
| 45 | first tee fitting |
| 50 | lower body base |
| 55 | second or following tee fitting |
| 60 | tee fitting |
| 65 | locking nut |
| 70 | fitting body |
| 75 | grill interior space |
| 80 | spray nozzle fitting |
| 85 | grilling surface |
| 90 | heat producing element |
| 95 | spray nozzle pattern |

DETAILED DESCRIPTION OF THE PREFERRED EMBODIMENT

The best mode for carrying out the invention is presented in terms of its preferred embodiment, herein depicted within the FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
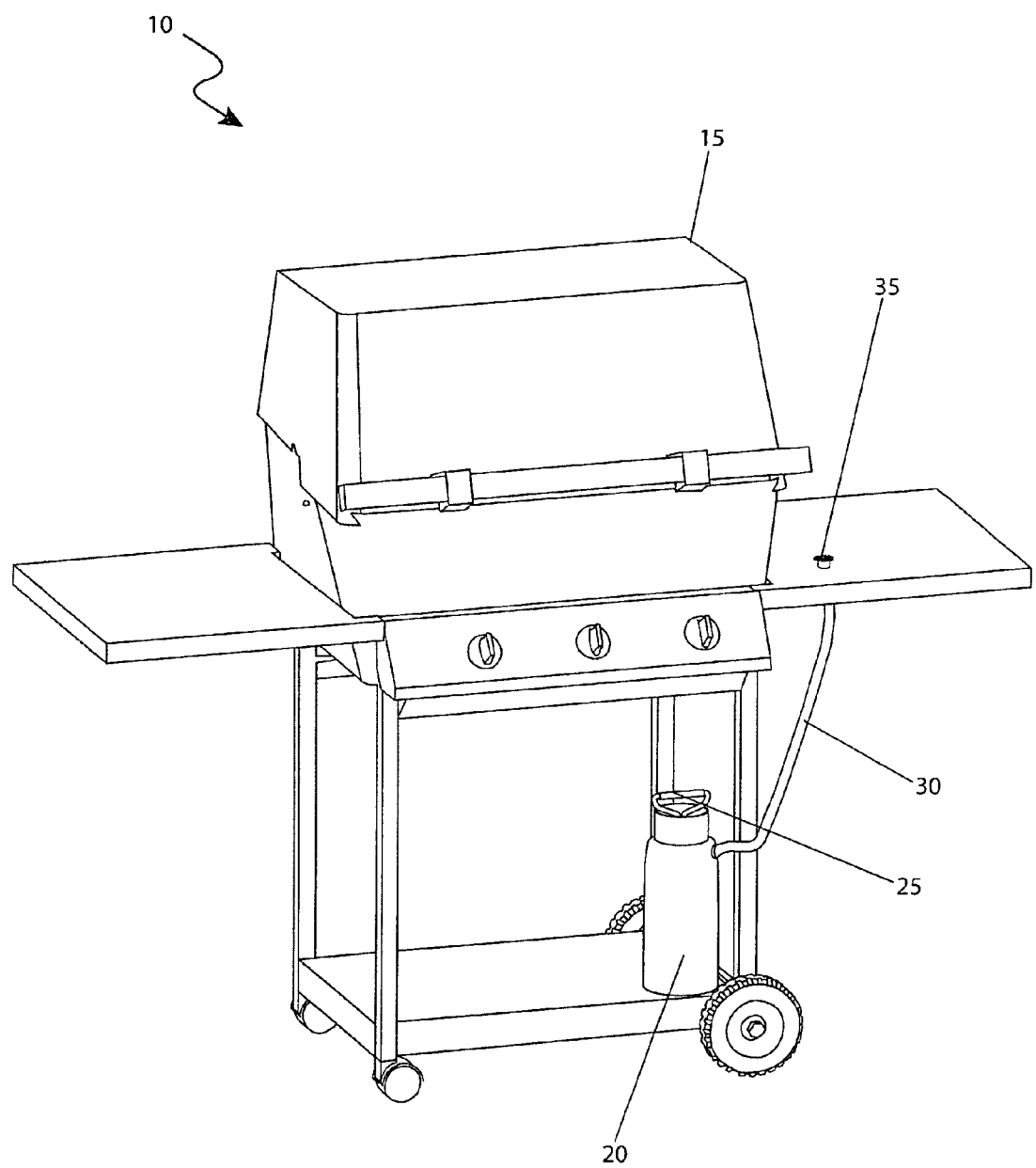
FIG. 1 is an isometric view of the flame suppression apparatus for barbeque grills 10, shown in an utilized state upon a barbeque grill 15, according to the preferred embodiment of the present invention.

Referring now to FIG. 1, an isometric view of the flame suppression apparatus for barbeque grills 10, shown in a utilized state upon a barbeque grill 15, according to the preferred embodiment of the present invention, is disclosed. The barbeque grill 15 is depicted as a common grill used in residential backyards. It is envisioned that the barbeque grill 15 would be heated by any of the conventional fuel or power sources. Such sources include but are not limited to charcoal, wood, propane, natural gas, and electricity. Additionally, the barbeque grill 15 can be any size or style ranging from small tabletop models used for camping, up to and including large grills used in outdoor restaurants or mobile catering operations. The flame suppression apparatus for barbeque grills 10 consists of a storage tank 20 with a top mounted manual pump 25. The storage tank 20 and manual pump 25 are similar to what may be utilized in an agricultural style sprayer. The storage tank 20 would be filled with common tap water at the beginning of a grilling process. The quantity of water contained by the storage tank 20 would be approximately two (2) to three (3) gallons for a common backyard barbeque grill 15 although smaller and larger storage tank 20 can be utilized as need for respectively smaller and larger barbeque grill 15. A section of flexible heat resistant tubing 30 connects the output of the storage tank 20 to a control valve 35. The control valve 35 would be mounted at the side or front of the barbeque grill 15 near the normal operating position of the barbeque grill 15 such that it is easily reached or accessed by the user at all times without bending, stooping, or exposing themselves to the heat or flames emanating form the barbeque grill 15. The output of the control valve 35 is connected to a series of spray nozzles 40 (not visible in this figure) on the rear of the barbeque grill 15. Further disclosure on the location and operation of the spray nozzles 40 (not visible in this figure) will be described in greater detail herein below.

Figure 2:
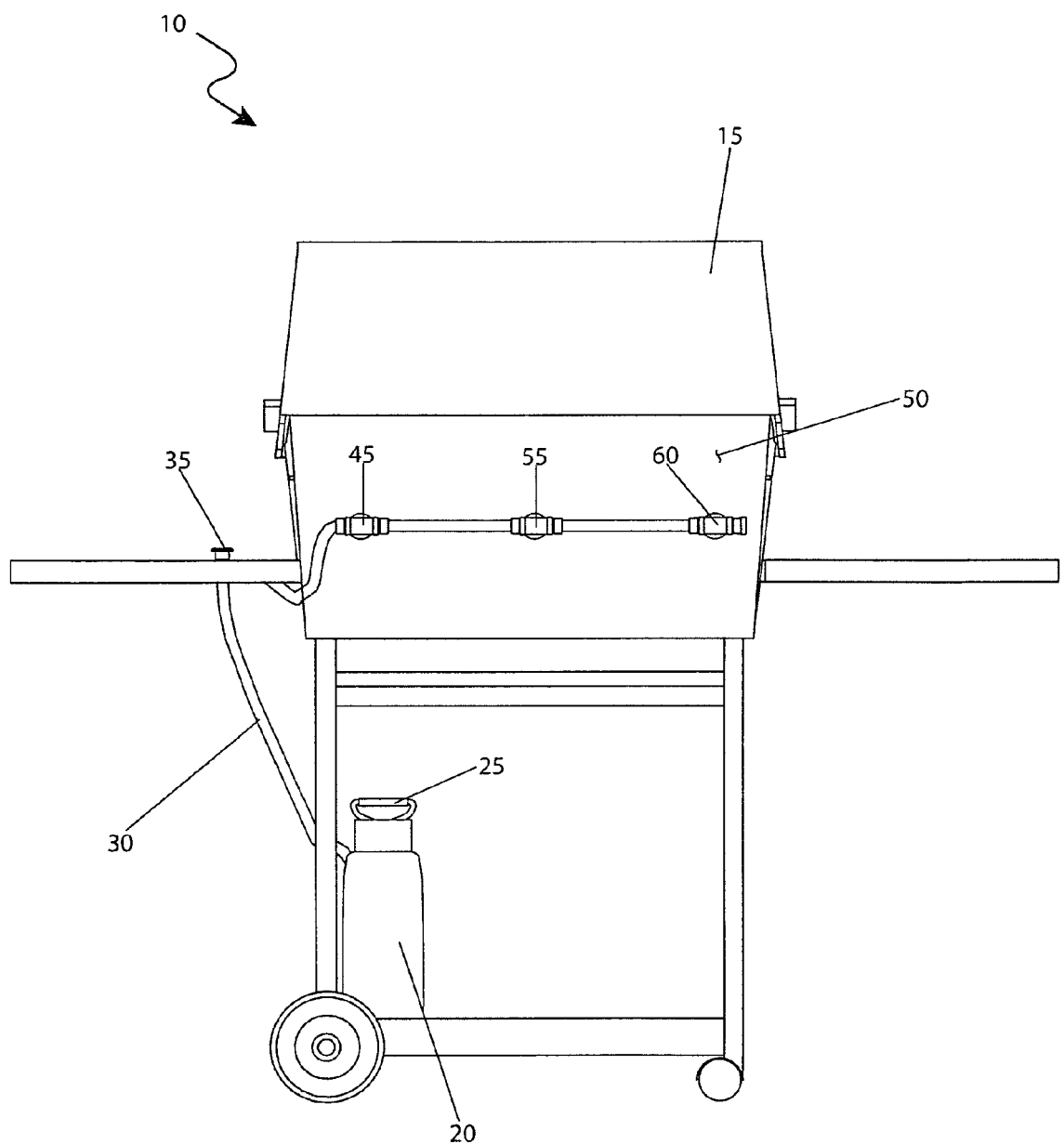
FIG. 2 is a rear view of the barbeque grill 15, depicting various components of the flame suppression apparatus for barbeque grills 10 according to the preferred embodiment of the present invention.

Referring next to FIG. 2, a rear view of the barbeque grill 15, depicting various components of the flame suppression apparatus for barbeque grills 10 according to the preferred embodiment of the present invention is disclosed. This figure once again displays the storage tank 20, the manual pump 25, the flexible heat resistant tubing 30 and the control valve 35 in its aforementioned described location. The output of the control valve 35 is connected to a first tee fitting 45. The first tee fitting 45 is located in the lower body base 50 of the barbeque grill 15, such that one side of the first tee fitting 45 projects into the interior of the barbeque grill 15. The remaining connection to the first tee fitting 45 continues to a second or following tee fitting 55 where the aforementioned connection repeats itself. The number of tee fittings is dictated by the physical size of the barbeque grill 15 with the most common number utilized envisioned to be two (2). The final output connection from the last tee fitting continues to 90 degree tee fitting 60. The tee fitting 60 provides one (1) projection into the interior of the barbeque grill 15. The spacing of the various tee fittings as well as the one (1) tee fitting 60 are such that equal coverage inside of the barbeque grill 15 is provided. It is envisioned that the flame suppression apparatus for barbeque grills 10 would be provided on new grills as standard or optional equipment. However, it is also envisioned that the features of the flame suppression apparatus for barbeque grills 10 could be provided in an add-on kit for aftermarket installation on existing barbeque grill 15.

Figure 3:
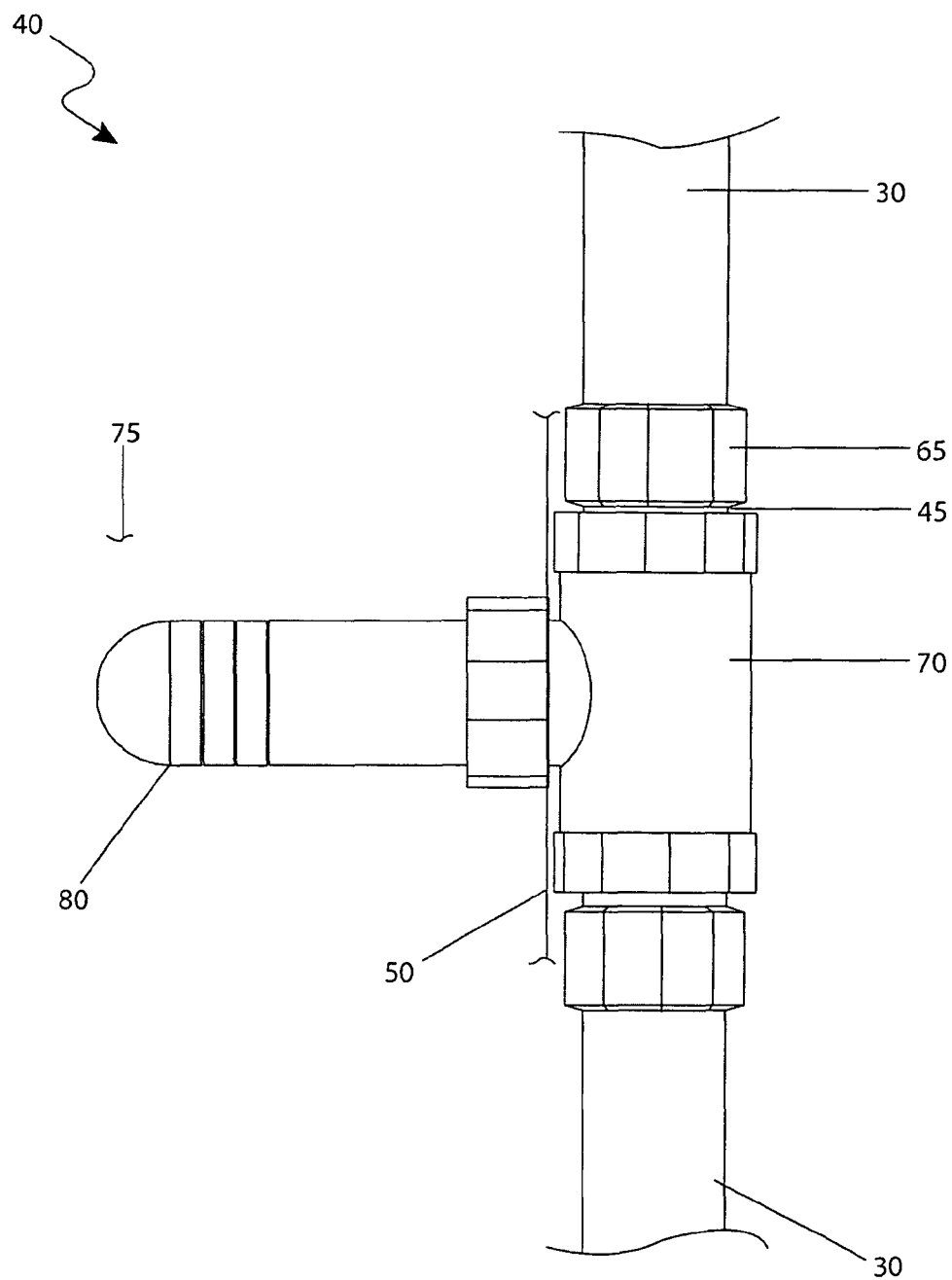
FIG. 3 is a detailed view of the spray nozzles 40 as used with the flame suppression apparatus for barbeque grills 10, according to the preferred embodiment of the present invention; and, FIG. 4 is an interior view of the barbeque grill 15 depicting the spray nozzle fitting 80 as use with the flame suppression apparatus for barbeque grills 10, according to the preferred embodiment of the present invention.

Referring now to FIG. 3, a detailed view of the spray nozzles 40 as used with the flame suppression apparatus for barbeque grills 10, according to the preferred embodiment of the present invention is shown. This view more clearly shows the incoming and outgoing connection into a first tee fitting 45, a second or following tee fitting 55, or other tee fittings based upon the physical size of the barbeque grill 15 (as shown in FIG. 1). The flexible heat resistant tubing 30 is connected to the tee fitting by use of locking nut 65 on the fitting body 70. Said connection is for illustrative purposes only and is not intended to limit the scope of the present invention. Other methods of connection such as crimp on connections, friction connections, flanged connections and the like can be used with equal effectiveness. The lower body base 50 is seen in a cross-sectional view thus exposing grill interior space 75. The fitting body 70 is provided with a spray nozzle fitting 80 on the grill interior space 75 side. The spray nozzle fitting 80 not only produces a fine water mist spray, but also serves as the connection fitting securing the fitting body 70 to the lower body base 50. A similar arrangement with the spray nozzle fitting 80 is used to secure the 90 degree tee fitting 60 (as shown in FIG. 2) as provided as the last segment of flexible heat resistant tubing 30.

Figure 4:
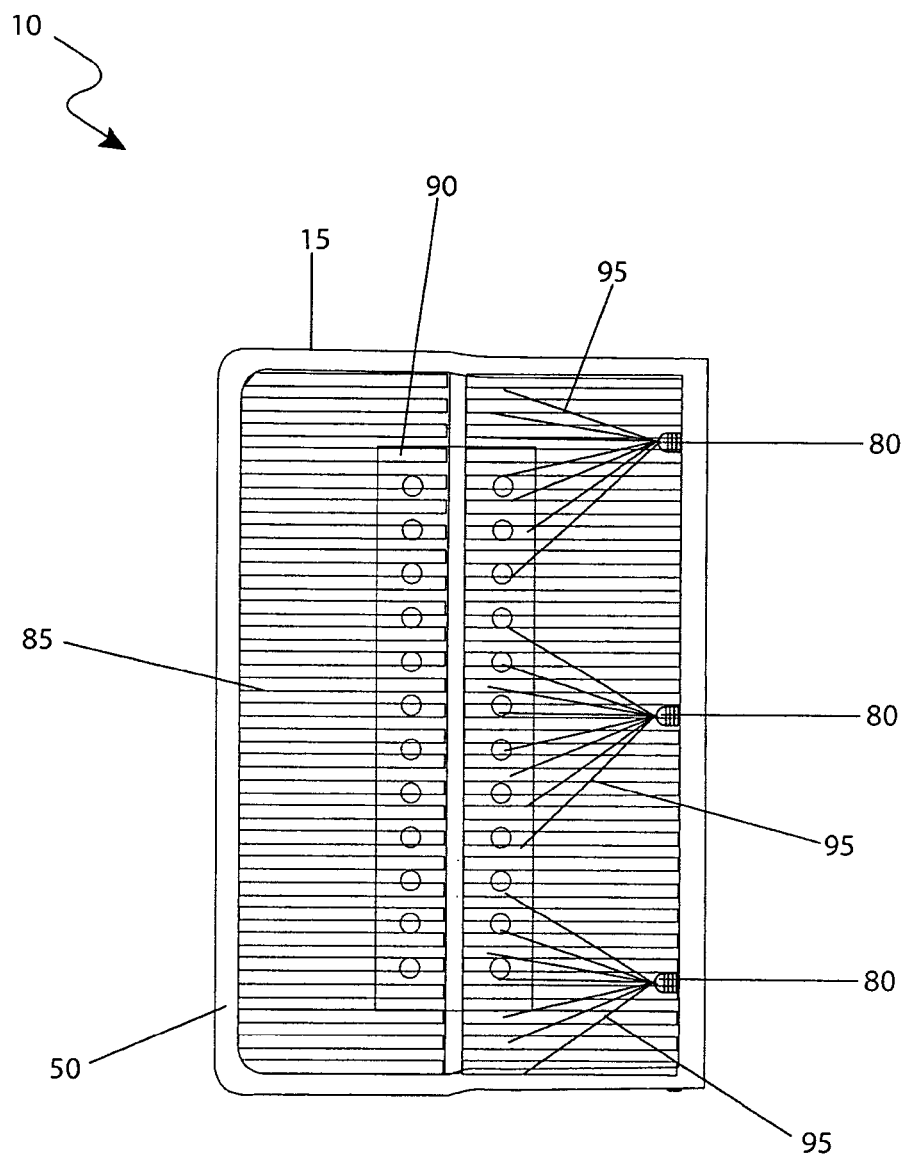

Referring finally, to FIG. 4, an interior view of the barbeque grill 15 depicting the spray nozzle fitting 80 as used with the flame suppression apparatus for barbeque grills 10, according to the preferred embodiment of the present invention is depicted. The lower body base 50 is visible along with a grilling surface 85 as would customarily be expected. A heat producing element 90 such as coals, a burner, a heating element or the like is also visible beneath the grilling surface 85. A series of three (3) spray nozzle fittings 80 are located along the rear wall of the t the rear of the lower body base 50. They are located below the grilling surface 85, but above the heat producing element 90. The spray nozzle pattern 95 generated by the spray nozzle fitting 80 are of a flat or fan-like nature. The spray nozzle pattern 95 thus produces a water spray to eliminate any grease dripping induced flare ups while cooking. Operation of the flame suppression apparatus for barbeque grills 10 will be described in greater detail herein below.

An alternate embodiment of the present invention provides for said apparatus 10 to be a built-in feature for a grill 15 as an as-purchased item.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the flame suppression apparatus for barbeque grills 10 would be constructed in general accordance with FIG. 1 through FIG. 4.

As aforementioned described, the flame suppression apparatus for barbeque grills 10 would be installed on a barbeque grill 15 of almost any size, type or fuel source. The invention would be ready to use in the case of a factory assembled version. In the case of an aftermarket version, the user would simply drill the necessary number of holes in the rear of the lower body base 50 and install the required fitting body 70 and secure with the spray nozzle fitting 80. Additionally, a hole would be required for the control valve 35 which would be installed on a readily accessible surface area on the front of the barbeque grill 15. At this point in time, the flame suppression apparatus for barbeque grills 10 equipped barbeque grill 15 is ready for operation.

The user would first begin operation of the flame suppression apparatus for barbeque grills 10 by filling up the storage tank 20 with water. Next, the manual pump 25 would be installed and manually operated to build up pressure in the storage tank 20 in a conventional manner. At this point in time, the flame suppression apparatus for barbeque grills 10 is prepared and ready for use.

The user would then prepare a fire or activate the barbeque grill 15 in a conventional manner. After an appropriate heating time, the various food stuffs would be cooked in a conventional manner. As the various food is cooked, grease and other ignitable products will drip from the food, especially meats, and fall onto the heat producing element 90 below. Under the proper conditions, a flare-up will result where the flames will reach out of the grill interior space 75 and possibly ignite the food being cooked. At this point in time, the user would simply open the control valve 35 releasing a spray nozzle pattern 95 within the grill interior space 75, thus extinguishing the flame. The user would then turn the control valve 35 back off and resume grilling. Said process would repeat in a cyclical manner until all food is cooked. This process eliminates the necessity of using a spray bottle, a glass of water, or other methods which may contaminate the food items being cooked since the water is dispensed below the food.

At the termination of the grilling process, the user would wait for the barbeque grill 15 to cool, and then remove any remaining pressure in the storage tank 20. Any remaining water would be emptied, thus preparing the flame suppression apparatus for barbeque grills 10 for future use at a later time.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A flame suppression device for use with barbecue grills, said flame suppression device comprising:
   a storage tank adapted to receive and store fluid therein, said storage tank including a manual pump for outwardly extracting the fluid therefrom;
   a control valve spaced downstream from said storage tank and adapted to be mounted to an existing barbeque grill;
   a tubing having a first end fluidly connected to an output of said storage tank, said tubing further being fluidly coupled to said control valve such that said control valve remains external disposed from said storage tank;

a series of tee fittings fluidly connected to said tubing and located downstream of said control valve respectively; and, a series of spray nozzles fluidly connected to corresponding ones of said tee fittings and being oriented substantially parallel thereto such that fluid is orthogonally directed away from said tubing during operating conditions;

wherein corresponding pairs of said tee fittings and said spray nozzles are adapted to be situated through a rear of the existing barbecue grill such that the fluid is discharged into an interior of the existing barbecue grill.

2. The flame suppression device of claim 1, wherein an output of said control valve is in fluid communication with a first one (1) of said tee fittings.

3. The flame suppression device of claim 2, wherein a remaining connection of said first tee fitting is in fluid communication with a second one (1) of said tee fittings located downstream therefrom.

4. The flame suppression device of claim 1, wherein each of said tee fittings are connected in series along said tubing such that a fluid output from an initial one (1) of said tee fittings defines a fluid input to an adjacent one (1) of said tee fittings located downstream therefrom.

5. The flame suppression device of claim 1, further comprising: a plurality of locking nuts removably connected to said tubing as well as opposed ends of said tee fittings respectively, said locking nuts maintaining a fluid communication between each of said tee fittings and said tubing during operating conditions.

6. The flame suppression device of claim 5, wherein each of said tee fittings comprises: a central body directly coupled to a corresponding one (1) of said spray nozzles respectively, said central body being intermediately situated between corresponding ones of said locking nuts.

7. The flame suppression device of claim 1, wherein each of said spray nozzles are adapted to be independently angled into an interior space of the existing barbecue grill while remaining below a grilling surface thereof, each of said tee fittings being adapted to remain disposed exterior of the existing barbecue grill such that said spray nozzles are adapted to be anchored directly to said rear of the existing barbecue grill.

8. A flame suppression device for use with barbecue grills, said flame suppression device comprising:

a storage tank adapted to receive and store fluid therein, said storage tank including a top mounted manual pump attached to said storage tank for outwardly extracting the fluid therefrom;

a control valve spaced downstream from said storage tank and adapted to be mounted to an existing barbeque grill;

a flexible heat resistant tubing having a first end fluidly connected to an output of said storage tank, said tubing further being fluidly coupled to said control valve such that said control valve remains external disposed from said storage tank;

a series of tee fittings fluidly connected to said tubing and located downstream of said control valve respectively; and, a series of spray nozzles fluidly connected to corresponding ones of said tee fittings and being oriented substantially parallel thereto such that fluid is orthogonally directed away from said tubing during operating conditions;

wherein corresponding pairs of said tee fittings and said spray nozzles are adapted to be situated through a rear of the existing barbecue grill such that the fluid is discharged into an interior of the existing barbecue grill.

9. The flame suppression device of claim 8, wherein an output of said control valve is in fluid communication with a first one (1) of said tee fittings.

10. The flame suppression device of claim 9, wherein a remaining connection of said first tee fitting is in fluid communication with a second one (1) of said tee fittings located downstream therefrom.

11. The flame suppression device of claim 8, wherein each of said tee fittings are connected in series along said tubing such that a fluid output from an initial one (1) of said tee fittings defines a fluid input to an adjacent one (1) of said tee fittings located downstream therefrom.

12. The flame suppression device of claim 8, further comprising: a plurality of locking nuts removably connected to said tubing as well as opposed ends of said tee fittings respectively, said locking nuts maintaining a fluid communication between each of said tee fittings and said tubing during operating conditions.

13. The flame suppression device of claim 12, wherein each of said tee fittings comprises: a central body directly coupled to a corresponding one (1) of said spray nozzles respectively, said central body being intermediately situated between corresponding ones of said locking nuts.

14. The flame suppression device of claim 8, wherein each of said spray nozzles are adapted to be independently angled into an interior space of the existing barbecue grill while remaining below a grilling surface thereof, each of said tee fittings being adapted to remain disposed exterior of the existing barbecue grill such that said spray nozzles are adapted to be anchored directly to said rear of the existing barbecue grill.

15. A method for suppressing barbecue flames during grilling operations, said method comprising the steps of:

providing a flame suppression device comprising:

a storage tank including a top mounted manual pump attached to said storage tank for outwardly extracting fluid therefrom;

a control valve spaced downstream from said storage tank and adapted to be mounted to an existing barbeque grill;

a flexible heat resistant tubing having a first end fluidly connected to an output of said storage tank, said tubing further being fluidly coupled to said control valve such that said control valve remains external disposed from said storage tank;

a series of tee fittings fluidly connected to said tubing and located downstream of said control valve respectively; and, a series of spray nozzles fluidly connected to corresponding ones of said tee fittings and being oriented substantially parallel thereto such that fluid is orthogonally directed away from said tubing during operating conditions;

situating corresponding pairs of said tee fittings and said spray nozzles through a rear of the existing barbecue grill;

filling up said storage tank with fluid;

building up air pressure in said storage tank by actuating said manual pump;

activating the existing barbeque grill to produce a fire;

cooking foodstuff on the existing barbecue grill;

upon detecting a flame flaring up above an interior space of the existing barbecue grill, opening said control valve;

releasing the fluid outwardly from said spray nozzles such that the fluid is discharged into the interior of the existing barbecue grill;

after extinguishing the flame, closing said control valve; and resuming grilling activities.

16. The method of claim 15, further comprising the steps of:

at a termination of a grilling process, waiting for the existing barbeque grill to cool; and, removing any remaining air pressure in said storage tank.

* * * * *